United States Patent
O'Brien

(10) Patent No.: US 10,535,035 B2
(45) Date of Patent: Jan. 14, 2020

(54) SYSTEMS AND METHODS FOR DELIVERING PRODUCTS TO MULTIPLE DELIVERY DESTINATIONS VIA AUTONOMOUS TRANSPORT VEHICLES

(71) Applicant: Walmart Apollo, LLC, Bentonville, AR (US)

(72) Inventor: John J. O'Brien, Farmington, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 16/059,488

(22) Filed: Aug. 9, 2018

(65) Prior Publication Data
US 2019/0066038 A1    Feb. 28, 2019

Related U.S. Application Data

(60) Provisional application No. 62/552,871, filed on Aug. 31, 2017.

(51) Int. Cl.
| | | |
|---|---|---|
| *G06Q 10/08* | (2012.01) | |
| *G05D 1/00* | (2006.01) | |
| *B65G 67/04* | (2006.01) | |
| *G01C 21/34* | (2006.01) | |
| *B65G 67/24* | (2006.01) | |

(52) U.S. Cl.
CPC ......... *G06Q 10/0832* (2013.01); *B65G 67/04* (2013.01); *B65G 67/24* (2013.01); *G01C 21/343* (2013.01); *G05D 1/0088* (2013.01); *B65G 2203/0216* (2013.01)

(58) Field of Classification Search
CPC ................................................. G06Q 10/0832
See application file for complete search history.

(56) References Cited

U.S. PATENT DOCUMENTS

| | | | | |
|---|---|---|---|---|
| 2,186,207 | A | * | 1/1940 | Rampacher ............... H02P 1/42 307/155 |
| 6,325,586 | B1 | | 12/2001 | Loy |
| 7,693,745 | B1 | | 4/2010 | Pomerantz |
| 8,200,363 | B2 | | 6/2012 | Cook |

(Continued)

FOREIGN PATENT DOCUMENTS

| | | |
|---|---|---|
| WO | 2016081794 | 5/2016 |
| WO | 2016145178 | 9/2016 |

OTHER PUBLICATIONS

Griffith, Chris, "Innovative Pair Hopes Their Drone Dream Delivers the Goods," The Australian, Australian Edition, 26, Canberra, ACT, News Limited, Nov. 18, 2014.*

(Continued)

*Primary Examiner* — Nathan Erb
(74) *Attorney, Agent, or Firm* — Fitch, Even, Tabin and Flannery LLP

(57) ABSTRACT

In some embodiments, methods and systems are provided that provided for delivering products ordered by a customer of a retailer to a delivery destination designated by the ordering customer by way of autonomous transport vehicles configured to identify products to be dropped off at their next delivery destinations and to prepare such products for deployment while the ATVs are still en-route to their next delivery destinations, and to automatically deploy such products upon arrival at such delivery destinations.

18 Claims, 7 Drawing Sheets

(56) References Cited

U.S. PATENT DOCUMENTS

| | | | |
|---|---|---|---|
| 8,280,548 B2 | 10/2012 | Zuber | |
| 8,784,034 B2 | 7/2014 | Lert, Jr. | |
| 9,056,577 B2 | 6/2015 | Corrigan | |
| 9,598,238 B2 | 3/2017 | Kadaba | |
| 9,741,010 B1* | 8/2017 | Heinla | G06Q 10/083 |
| 2002/0023023 A1* | 2/2002 | Borecki | G06Q 20/04 |
| | | | 705/26.62 |
| 2012/0030133 A1 | 2/2012 | Rademaker | |
| 2013/0035856 A1* | 2/2013 | Connors | G06F 8/60 |
| | | | 701/484 |
| 2014/0279596 A1 | 9/2014 | Waris | |
| 2014/0330456 A1 | 11/2014 | Lopez Morales | |
| 2015/0006005 A1* | 1/2015 | Yu | G06Q 10/08 |
| | | | 701/22 |
| 2016/0200438 A1* | 7/2016 | Bokeno | B64C 39/024 |
| | | | 244/2 |
| 2016/0221768 A1* | 8/2016 | Kadaba | B65G 67/04 |
| 2017/0132562 A1 | 5/2017 | High | |
| 2017/0137128 A1 | 5/2017 | Natarajan | |
| 2017/0236092 A1 | 8/2017 | High | |
| 2017/0357919 A1* | 12/2017 | Bischoff | B07C 3/08 |
| 2018/0170674 A1* | 6/2018 | Luckay | B65G 1/137 |
| 2019/0043370 A1* | 2/2019 | Mulhall | G08G 5/0069 |

OTHER PUBLICATIONS

PCT; App. No. PCT/US2018/047856; International Search Report and Written Opinion dated Oct. 26, 2018.

"How Can I Use the Power Tailgate to Help Me Unload My Product Off the Truck?"; https://www.youtube.com/watch?v=CF1h65mcE3w; published on May 1, 2009; pp. 1-5.

"Truck Unloading Conveyor Extends to 94' Long—by Multi-Conveyor"; https://www.youtube.com/watch?v=ZhgmixXh4aU; published on Nov. 23, 2016; pp. 1-5.

\* cited by examiner

SYSTEMS AND METHODS FOR DELIVERING PRODUCTS TO MULTIPLE DELIVERY DESTINATIONS VIA AUTONOMOUS TRANSPORT VEHICLES

CROSS-REFERENCE TO RELATED APPLICATION

This application claims the benefit of U.S. Provisional Application No. 62/552,871, filed Aug. 31, 2017, which is incorporated herein by reference in its entirety.

TECHNICAL FIELD

This disclosure relates generally to delivering products and, in particular, to delivering products to customers at multiple delivery destinations via autonomous transport vehicles.

BACKGROUND

Customers often purchase products from retailers over the internet. Generally, the products purchased by a customer are delivered to a physical address provided by the customer, for example, a home where the customer lives, or an office where the customer works. Typically, the products ordered by customers of a retailer are loaded (in some cases, on a first in, first out basis) into a delivery vehicle of the retailer (or a delivery service used by the retailer) and delivered one by one to each customer's designated delivery location (e.g., home). Often, after the operator of the delivery vehicle arrives at the delivery destination, the operator is required to search the cargo area of the delivery vehicle for the package that is to be dropped off, which wastes valuable time for the delivery service operator.

Product delivery using unmanned vehicles is also becoming a popular idea. The unmanned vehicles are typically loaded with the product to be delivered, deliver the product to its intended destination, and return to its deployment station/vehicle to be loaded with the next product. However, such one-by-one delivery of products and the return of the unmanned vehicle to its deployment station after each delivery is inefficient from a time and cost of operation standpoint for the delivery service, which is likely to pass the cost to the retailer.

BRIEF DESCRIPTION OF THE DRAWINGS

Disclosed herein are embodiments of apparatuses, methods, and systems pertaining to facilitating delivery of packages containing products ordered by customers to delivery destinations via autonomous transport vehicles. This description includes drawings, wherein.

Figure 1:
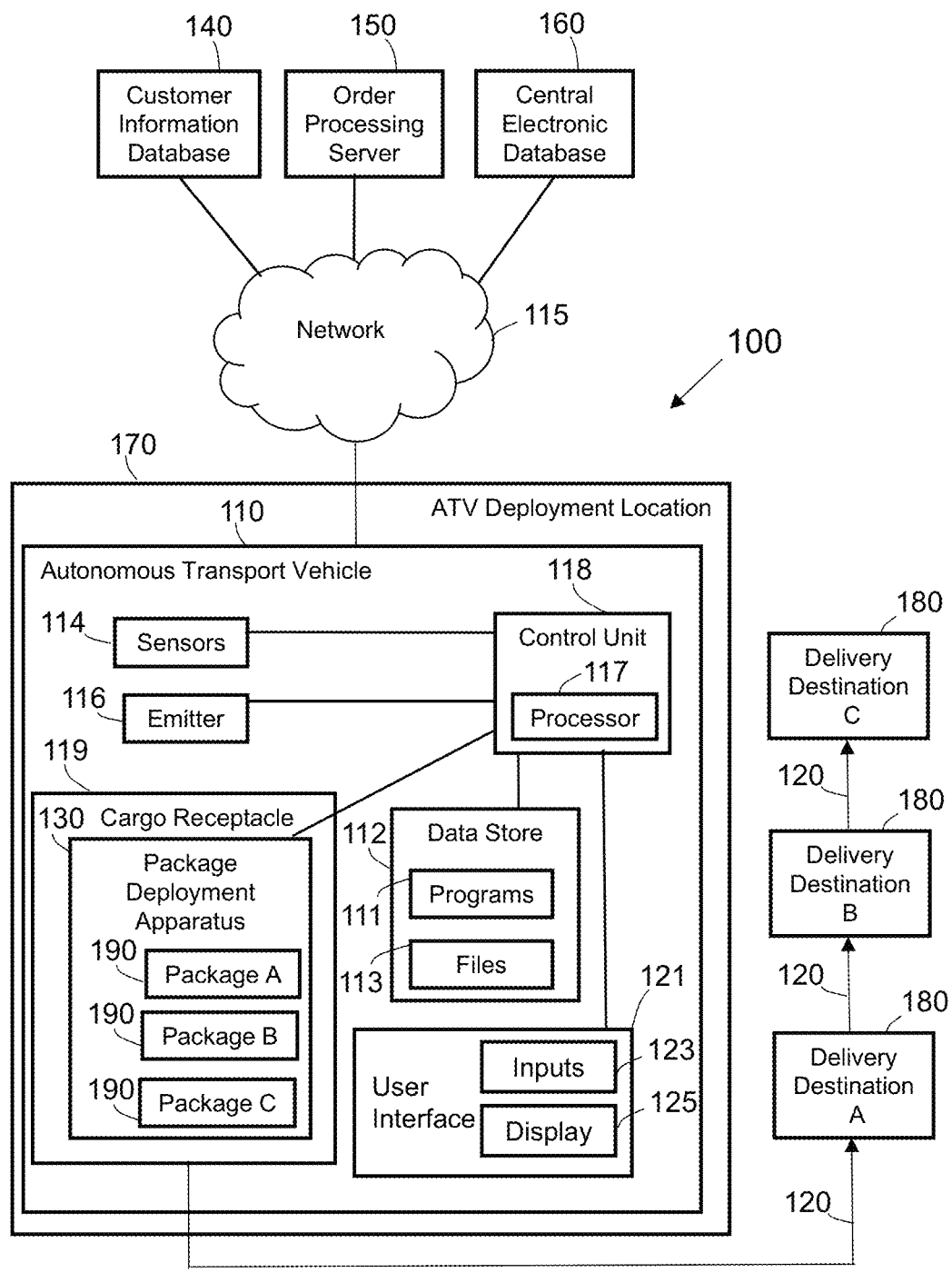
FIG. 1 is a diagram of facilitating delivery of packages containing products ordered by customers to delivery destinations via unmanned aerial vehicles in accordance with some embodiments.

Elements in the figures are illustrated for simplicity and clarity and have not been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Generally speaking, pursuant to various embodiments, systems and methods are provided for delivering products ordered by a customer of a retailer to a delivery destination designated by the ordering customer by way of autonomous transport vehicles configured to identify products to be dropped off at their next delivery destinations and to prepare such products for deployment while the autonomous transport vehicles are still en-route to their next delivery destinations, and to automatically deploy such products upon arrival at such delivery destinations.

In some embodiments, a system of facilitating delivery of packages containing products ordered by customers to delivery destinations via autonomous transport vehicles includes at least one autonomous transport vehicle configured to transport at least one package to at least one delivery destination. The autonomous transport vehicle includes a processor-based control unit, at least one sensor, a cargo receptacle configured to retain the at least one package, and a package deployment apparatus in communication with the control unit and configured to move the at least one package within the cargo receptacle and to eject the at least one package from the cargo receptacle. The control unit is configured to: obtain a delivery destination of the at least one package in response to scan of the at least one package via the at least one sensor during a loading of the at least one package into the cargo receptacle; determine a delivery route for the at least one autonomous transport vehicle from a deployment location of the at least one autonomous transport vehicle to the at least one delivery destination; analyze the determined delivery route of the autonomous transport vehicle from the deployment location to the at least one delivery destination to determine a drop off sequence in which the at least package is to be dropped off at the at least one delivery destination along the determined delivery route; obtain, via the at least one sensor and during movement of the at least one autonomous transport vehicle along the determined delivery route, a location of the at least one autonomous transport vehicle relative to a location of the at least one delivery destination that is next in the drop off sequence; activate the package deployment apparatus to move, within the cargo receptacle, the at least one package associated with the at least one delivery destination that is next in the drop off sequence, based on a determination by the control circuit that the autonomous transport vehicle is located within a predefined threshold distance from the at least one delivery destination that is next in the drop off sequence; and cause the package deployment apparatus to eject, from the cargo receptacle, the at least one package moved within the cargo receptacle by the package deployment apparatus from the cargo receptacle, based on a determination by the control circuit that the at least one autonomous transport vehicle is at the at least one delivery destination that is next in the drop off sequence.

In some embodiments, a method of facilitating delivery of packages containing products ordered by customers to delivery destinations via autonomous transport vehicles includes: providing at least one autonomous transport vehicle configured to transport at least one package to at least one delivery destination, the autonomous transport vehicle including a processor-based control unit, at least one sensor, a cargo receptacle configured to retain the at least one package, and a package deployment apparatus in communication with the control unit and configured to move the at least one package within the cargo receptacle and to eject the at least one package from the cargo receptacle. The method further includes: obtaining, via the control unit, a delivery destination of the at least one package by scanning the at least one package via the at least one sensor during a loading of the at least one package into the cargo receptacle; determining, via the control unit, a delivery route for the at least one autonomous transport vehicle from a deployment location of the at least one autonomous transport vehicle to the at least one delivery destination; analyzing, via the control unit, the determined delivery route of the autonomous transport vehicle from the deployment location to the at least one delivery destination to determine a drop off sequence in which the at least package is to be dropped off at the at least one delivery destination along the determined delivery route; obtaining, via the at least one sensor and during movement of the at least one autonomous transport vehicle along the determined delivery route, a location of the at least one autonomous transport vehicle relative to a location of the at least one delivery destination that is next in the drop off sequence; activating, via the control unit, the package deployment apparatus to move, within the cargo receptacle, the at least one package associated with the at least one delivery destination that is next in the drop off sequence, based on a determination by the control circuit that the autonomous transport vehicle is located within a predefined threshold distance from the at least one delivery destination that is next in the drop off sequence; and causing, via the control unit, the package deployment apparatus to eject, from the cargo receptacle, the at least one package moved by the package deployment apparatus in the causing step from the cargo receptacle, based on a determination by the control circuit that the at least one autonomous transport vehicle is at the at least one delivery destination that is next in the drop off sequence.

FIG. 1 shows an embodiment of a system 100 for delivering of packages containing products purchased by customers from a retailer. It will be understood that the details of this example are intended to serve in an illustrative capacity and are not necessarily intended to suggest any limitations in regards to the present teachings. The retailer may be any entity operating as a brick-and-mortar physical location and/or a website accessible, for example, via the internet or another network, by way of which products may be ordered by a consumer (e.g., customer of the retailer). A customer may be an individual or business entity. Exemplary products that may be ordered by the customer via the system 100 may include, but are not limited to, general-purpose customer goods and consumable products (e.g., food items, medications, or the like).

The exemplary system 100 depicted in FIG. 1 includes an order processing server 150 configured to process a purchase order by a customer for one or more products offered by the retailer. It will be appreciated that the order processing server 150 is an optional component of the system 100, and that some embodiments of the system 100 are implemented without incorporating the order processing server 150. The order processing server 150 may be implemented as one server at one location, or as multiple interconnected servers stored at multiple locations operated by the retailer, or for the retailer. As described in more detail below, the order processing server 150 may communicate with one or more electronic devices of system 100 via a network 115. The network 115 may be a wide-area network (WAN), a local area network (LAN), a personal area network (PAN), a wireless local area network (WLAN), Wi-Fi, Zigbee, Bluetooth, or any other internet or intranet network, or combinations of such networks. Generally, communication between various electronic devices of system 100 may take place over hard-wired, cellular, Wi-Fi or Bluetooth networked components or the like. In some embodiments, one or more electronic devices of system 100 may include cloud-based features, such as cloud-based memory storage.

The exemplary system 100 of FIG. 1 includes a customer information database 140. It will be appreciated that the customer information database 140 is an optional component of the system 100, and that some embodiments of the system 100 are implemented without incorporating the customer information database 140. In some embodiments, the customer information database 140 may be configured to store information associated with customers of the retailer who order products from the retailer. In some embodiments, the customer information database 140 may store electronic information including but not limited to: personal information of the customers, including payment method information, billing address, previous delivery addresses, phone number, product order history, pending order status, product order options, as well as product delivery options of the customer. The customer information database 140 may be stored, for example, on non-volatile storage media (e.g., a hard drive, flash drive, or removable optical disk) internal or external to the order processing server 150 or other computing devices separate and distinct from the order processing server 150. It will be appreciated that the customer information database 140 may likewise be cloud-based.

In the embodiment depicted in FIG. 1, the system 100 includes a central electronic database 160 configured to store information associated with the inventory of products made available by the retailer to the customer, as well as information associated with the autonomous transport vehicles (ATVs) 110 being deployed to deliver product-containing packages 190 to the delivery destinations 180 specified by the customers. In some aspects, the central electronic database 160 stores information including but not limited to: information associated with the packages 190 being transported by the ATV 110; inventory (e.g., on-hand, sold, replenishment, etc.) information associated with the products; delivery status information associated with the ATVs 110; information associated with predetermined delivery routes 120 of the ATV 110; and status input information detected by one or more sensors 114 of the ATV 110 during along the predetermined delivery route 120.

In some embodiments, the central electronic database 160 of FIG. 1 is configured to store electronic data associated with the product-containing packages 190 being loaded into the ATV 110, which data is acquired by one or more of the sensors 114 of the ATV 110 and transmitted to the central electronic database 160 by the ATV 110 over the network 115. Electronic data that may be stored in the central electronic database 160 includes but is not limited to: identifying information associated with the packaged products (e.g., barcode and/or other identifying indicia); date of purchase of the products; price of purchase of the products; delivery destination pertaining to the products; delivery vehicle loading location (e.g., ATV deployment location 170); delivery route information associated with each of the ATVs 110; and information (e.g., name, address, payment information, etc.) pertaining to one or more consumers (or other intended recipients) associated with the packages being loaded into the ATV 110.

The central electronic database 160 may be stored, for example, on non-volatile storage media (e.g., a hard drive, flash drive, or removable optical disk) internal or external to the order processing server 150 or computing devices separate and distinct from the order processing server 150. The central electronic database 160 may likewise be cloud-based. While the customer information database 140 and the central electronic database 160 are shown in FIG. 1 as two separate databases, it will be appreciated that the customer information database 140 and the central electronic database 160 can be incorporated into one database.

In some embodiments, the order processing server 150 is configured to receive and process orders for products placed by customers of the retailer, to receive and process payment for the products, and to transmit information associated with the processed orders to the central electronic database 160 and/or customer information database 140 and/or ATV 110. It will be appreciated that the order processing server 150, customer information database 140, and central electronic database 160 may be located at different geographic locations, or may be located at the same facility and/or may be all incorporated into a single electronic device in some embodiments.

With reference to FIG. 1, the ATV 110 is generally a vehicle configured to autonomously traverse one or more intended environments in accordance with one or more routes and/or determined paths, and typically without the intervention of a human or a remote computing device, while retaining product-containing packages 190 in an interior thereof, and delivering the packages 190 from an ATV deployment location 170 to one or more delivery destinations 180 designated by one or more customers who purchased the products located in the packages 190. The ATV 110 may be an autonomous ground vehicle (AGV) or an unmanned aerial vehicle (UAV or drone). In some instances, a remote operator or a remote computer (e.g., central computing device, deployment mothership computing device, etc.) may temporarily or permanently take over operation of the ATV 110 using feedback information from the ATV 110 (e.g., audio and/or video content, sensor information, etc.).

In some embodiments, the ATV 110 includes one or more propulsion systems (e.g., motors, wheels, tank treads, propellers, etc.) that enable the ATV 110 to at least accelerate, deaccelerate, and/or traverse an environment using a navigation coordinate system, such as global position system (GPS), coordinate mapping information, beacon location information, cellular signal triangulation, other navigation systems and/or information, or a combination of two or more of such navigation systems and/or information. Further, the navigation coordinate system can be configured to provide location information, and in some instances time information. In some embodiments, the ATV 110 is configured to operate in different weather conditions, and/or can be readily modified depending on expected weather conditions. The ATV 110 can, in some applications, be further configured to communicate with other transport vehicles (e.g., AGVs, UAVs, manned transport vehicles), multiple different types of computing devices, a remote central control system, other computing devices, remote databases, and/or other such devices.

The exemplary ATV 110 of FIG. 1 includes one or more data stores 112, sensors 114, emitters 116, and user interface 121 each in communication with one or more control units 118 that include one or more processors 117. In some aspects, the emitter 116 and the sensor 114 are implemented together as a single device. The ATV 110 deployed in some embodiments of the system 100 does not require physical operation by a human operator and is wholly or largely controlled by the control unit 118. For example, the control unit 118 may control directional (e.g., ground-based on airborne) movement of the ATV 110 toward/away from each delivery destination 180 based on a variety of inputs.

The control unit 118 of the ATV 110 can be configured (for example, by using corresponding programming stored in the data store 112 as will be well understood by those skilled in the art) to carry out one or more of the steps, actions, and/or functions described herein. In some embodiments, the data store 112 may be integral to the processor-based control unit 118, or can be physically discrete (in whole or in part) from the control unit 118 and is configured non-transitorily store the computer instructions that, when executed by the control unit 118, cause the control unit 118 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM)) as well as volatile memory (such as an erasable programmable read-only memory (EPROM))). Thus, the memory and/or the control unit may be referred to as a non-transitory medium or non-transitory computer readable medium.

In some embodiments, the emitter 116 is configured as a two-way transceiver that can communicate with other electronic devices (e.g., central electronic database 160, customer information database 140, order processing server 150, etc.) over the network 115. For example, in some embodiments, the emitter 116 of the ATV 110 is configured to transmit, via the network 115, a signal to the computing devices (e.g., mobile phones) of customers associated with delivery destinations A, B, and C. In some aspects, such a signal includes an electronic notification that a package 190 (e.g., package A, B, or C) has been delivered by the ATV 110 to its respective delivery destination 180 (delivery destination A, B, or C). In one approach, after a customer retrieves his or her respective package 190 from the ATV 110 at the delivery destination 180, the control unit 118 of the ATV is programmed to send a signal via the emitter 116 to the order processing server 150 and/or central electronic database 160 and/or customer information database 140 indicating that the package 190 ordered by the customer has been successfully delivered to its respective delivery destination 180.

In some embodiments, the emitter 116 of the ATV 110 is a wired or a wireless transceiver configured to convey information, notifications, warnings and/or deterrents to a customer, a worker of the retailer, a potential threat (e.g., animal, person that is a potential threat), unknown third party, a remote central control system, a security service, a municipal police service, other such entities, or combination of two or more of such entities. The emitter 116 can comprise one or more output devices (e.g., speakers, displays, whistles, buzzers, lights and similar items) that convey text, audio, and/or visual signals. In some embodiments, emitter 116 can be configured to convey notifications having textual, audible and/or visual content. Similarly, the emitter 116 may additionally or alternatively be configured to facilitate wireless data communications with a remote computing device (e.g., device configured to control the ATV 110) over the network 115.

In some embodiments, one or more data stores 112 provide an information repository that typically stores programs 111 and files 113. The ATV 110 may, in some embodiments, further access one or more programs 111, files 113, and/or other relevant information external to ATV 110 and accessible via network 115. Files 113 can comprise information transmitted to the ATV 110 and/or by the ATV 110 via the emitter 116, data captured by the sensors 114, customer information, customer identifier information, product and/or package information, customer order information, navigation and/or routing information, location information, mapping information, ATV identifier information, communication procedures, threat information, sensor data, images, video, and/or other such information. In some aspects, files 113 can include personal and/or non-public information about the customers, for example, predefined biometric data associated with the customers, which can be used by the ATV 110 for authentication purposes, and/or determining unknown and/or hostile third parties. Applicable biometric data that may be stored in the data stores 112 can include, but is not limited to voice prints, iris patterns, retina-patterns, hand geometries, earlobe geometries, facial landmarks, thermographic signatures, vascular patterns, skin texture data points, and/or walking gate data points. Predetermined biometric data can include data captured by the sensors 114, provided by the customers, external sensors, and/or received from an external central computing system.

As described above, the ATV 110 further includes programs 111 that are stored in the data store 112 and/or other memory, and utilized at least by the control unit 118. In some applications, one or more of the programs 111 are software that are executed by the control unit 118 to facilitate the operation, navigation, preparation of packages 190 for deployment, control, interaction with customers, deterring potential danger and the like to the ATV 110. For example, the control unit 118, in executing one or more programs 111, can use data generated by sensors 114 to detect when customers or hostile third parties are positioned within a threshold distance relative to the ATVs 110, generate notifications in response to detecting the presence of customers and/or hostile third parties. For example, the presence of the authorized customer who is associated (e.g., in the customer information database 140 and/or central electronic database 160) with a given delivery destination 180 is positioned within a threshold distance relative to an ATV 110 can be confirmed using geolocation data based on GPS data obtained by the ATV 110 via the emitter 116 from the electronic device (e.g., mobile phone) of the customer.

Additionally or alternatively, control unit 118, in executing one or more programs 111, can generate one or more types of biometric data (discussed above) using information captured via sensor 114, and determine whether the generated biometric data has one or more threshold relationships to predetermined biometric data included in files 113, wherein generated biometric data having threshold relationships identify customers and such data lacking the threshold relationships identify unknown and/or hostile third parties. Hostile third parties can refer to any human or animal or autonomous vehicle attempting to interfere with the operation of ATV 110, which may, for example, be characterized as any attempts to gain unauthorized access to the ATV 110 software and/or hardware, attempts to gain unauthorized access to the packages 190 being transported by the ATV 110, attempt to damage the ATV 110, attempts to obstruct the travel path of ATV 110, and/or other activities that may be detrimental to or interfere with the ATV 110.

In the embodiment shown in FIG. 1, the processor-based control unit 118 of the ATV 110 is electrically coupled to a user interface 121, which may include a visual display or display screen (e.g., LED screen) and/or button input 123 that provide the user interface 121 with the ability to permit an operator of the ATV 110 (e.g., worker at ATV deployment location 170, customer, etc.) to manually control and/or interact with the ATV 110 by inputting commands via touch-screen and/or button operation and/or voice commands to, for example, to communicate with a computing device of a customer associated with a given delivery destination 180 over the network 115. It will be appreciated that the performance of such functions by the processor-based control unit 118 of the ATV 110 is not dependent on a human operator, and that the control unit 210 may be programmed to perform such functions without a human operator.

The exemplary ATV 110 of FIG. 1 includes a cargo receptacle 119 configured to retain one or more packages 190 (e.g., A, B, C) therein. In addition, the exemplary ATV 110 of FIG. 1 includes a package deployment apparatus 130 in communication with the control unit 118 and configured to move one or more packages within the cargo receptacle 119 of the ATV 110 and to eject one or more packages 190 from the cargo receptacle 119. The package deployment apparatus 130 will be discussed in more details below but is generally a structure located within the ATV 110 that is configured to move, lift, drop, and/or grasp the product-containing packages 190 within and, in some cases, out of the cargo receptacle 119 of the ATV 110.

Mechanisms suitable for use in the package deployment apparatus 130 include, but are not limited to: rotatable carousels, rotatable trays, mechanical arms, aerial cranes, support surfaces including movable ball bearings, chutes, or the like. Some exemplary mechanisms that may be with various ground-based and drone-based embodiments of the ATV 110 are illustrated in FIGS. 2-10 and are discussed in turn below.

For example, in an exemplary ATV configured to deliver packages 190 by flying through the air along the delivery route 120, a package deployment apparatus 230 according to one embodiment (see FIGS. 2-4) may include a movable platform 231 configured to support the packages 190 (e.g., A, B, C) thereon, and a movable picking arm 233 configured to couple to the packages 190 located on the movable platform 231, to lift the packages 190 from the movable platform 231, and to eject one or more of the packages 190 lifted from the movable platform 231 from the cargo receptacle 219 and through an opening 237 of the cargo receptacle 219 onto a package drop off area at the delivery destination 180 that is next in the drop off sequence.

Figure 2:
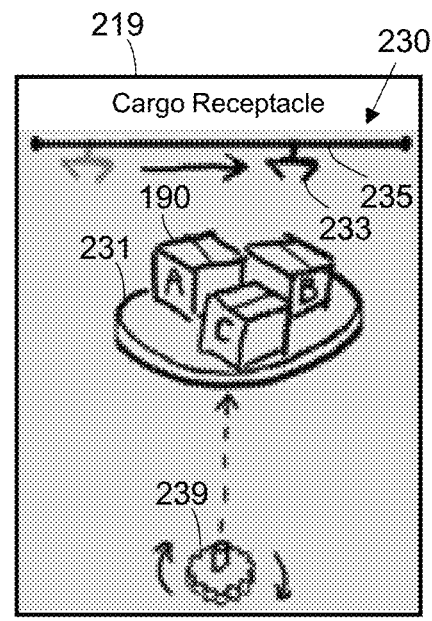
FIG. 2 is a diagram of a cargo receptacle including a package deployment mechanism in accordance with some embodiments showing the products being in their initial, as loaded positions.
Figure 3:
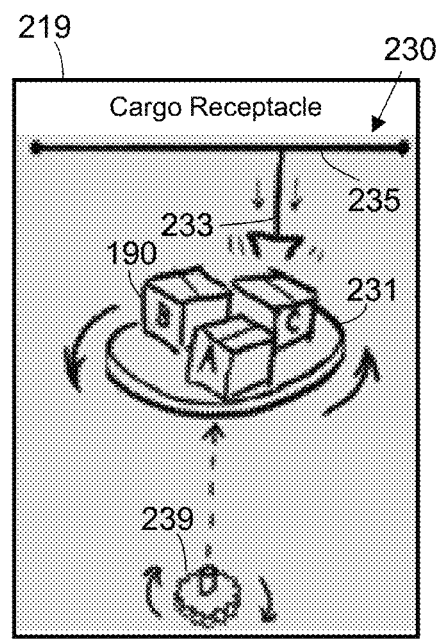
FIG. 3 is the diagram of the cargo receptacle including the package deployment mechanism of FIG. 2, showing the products after they are moved by the package deployment mechanism to a position where package C is ready to be ejected.
Figure 4:
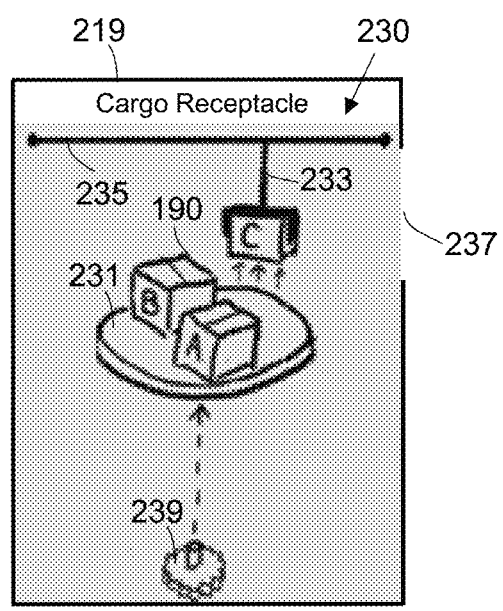
FIG. 4 is the diagram of the cargo receptacle including the package deployment mechanism of FIG. 2, showing product C being grasped in preparation for being ejected from the cargo receptacle.

In the exemplary embodiment illustrated in FIGS. 2-4, the movable platform is coupled to a mechanism 239 (one or more gears, etc.) that enables the platform to rotate about an axis while moving the package 190 thereon into alignment with the picking arm 233. In the exemplary embodiment illustrated in FIG. 2, the picking arm 233 is coupled to a support structure 235 (which may be a track slide, etc.) that permits the picking arm 233 both to move laterally (i.e., in parallel to the support structure 235) in the direction indicated by the arrow in FIG. 2 and downwardly (i.e., perpendicularly to the support structure 235) in the direction indicated by the arrows in FIG. 3.

In particular, FIG. 2 represents an exemplary initial arrangement (i.e., as loaded into the cargo receptacle 219) of packages A, B, C, on the movable platform 231. As can be seen in FIG. 2, package B as loaded is initially aligned with the picking arm 233 of the package deployment apparatus 230. After the package deployment apparatus 230 is deployed (e.g., in response to an activation signal transmitted by the control unit 118, which, as will be discussed in more detail below, is transmitted in some embodiment transmitted when the ATV is within a predefined threshold distance of the delivery destination 180 (i.e., delivery destination C in this example)), the mechanism 239 rotates in the direction indicated by the arrows in FIG. 3, thereby rotating the movable platform 231 in the direction indicated by the arrows in FIG. 3, such that package C is moved by the movable platform 231 into alignment with the picking arm 233, as shown in FIG. 3.

As can be seen in FIG. 3, after package C is moved into alignment with the picking arm 233, the picking arm 233 is lowered in a direction toward package C, as indicated by the arrows in FIG. 3 until the picking arm 233 grasps package C. With package C being grasped by the picking arm 233, the picking arm 233 is then moved away from the movable platform 231 in the direction indicated by the arrows in FIG. 4, and may then be moved in the direction indicated by the arrow in FIG. 4 to eject package C from the cargo receptacle 219 through an opening 237 of the cargo receptacle 219, and either onto a package drop off area at delivery destination C, or into the hands of the customer at the delivery destination C.

In an exemplary ATV configured to deliver packages 190 by flying through the air along the delivery route 120, a package deployment apparatus 330 according to one embodiment (see FIGS. 5-7) may include a movable support structure 331 including one or more picking arms 333 configured to couple to and retain any of the packages 190 (i.e., A, B, or C). In the exemplary embodiment of FIG. 5, the picking arm 333 is coupled to the support structure 331 (which may be a track slide, etc.) that permits the picking arm 333 both to move laterally (i.e., in parallel to the support structure 331) in the direction indicated by the arrow in FIG. 5 and downwardly (i.e., perpendicularly to the support structure 331) in the direction indicated by the arrows in FIGS. 6-7. In some embodiments, the package deployment apparatus may include one picking arm 333 coupled to each package A, B, and C, and the picking arms 333 are configured to move only downwardly and upwardly (as seen in FIGS. 6 and 7) relative to the support structure 331.

Figure 5:
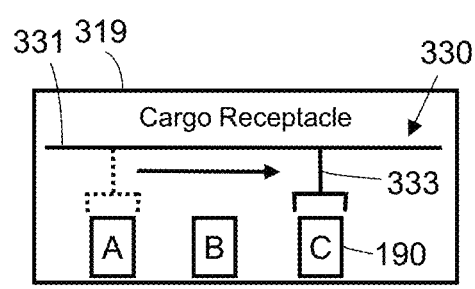
FIG. 5 is a diagram of a cargo receptacle including a package deployment mechanism in accordance with some embodiments showing the products being in their initial, as loaded positions.

In particular, FIG. 5 represents an exemplary initial arrangement (i.e., as loaded into the cargo receptacle 319) of packages A, B, C. As can be seen in FIG. 5, package A as loaded is initially aligned with the picking arm 333 of the package deployment apparatus 330. After the package deployment apparatus 330 is deployed (e.g., in response to an activation signal transmitted by the control unit 118, which, as will be discussed in more detail below, is in some embodiment transmitted when the ATV within a predefined threshold distance of the delivery destination 180 (i.e., delivery destination C in this example)), the picking arm 333 moves from its initial position (indicated in dashed lines in FIG. 5) to its ready-to-deploy position (indicated in solid lines in FIG. 5), such that the picking arm 333 is moved into alignment with package C.

Figure 6:
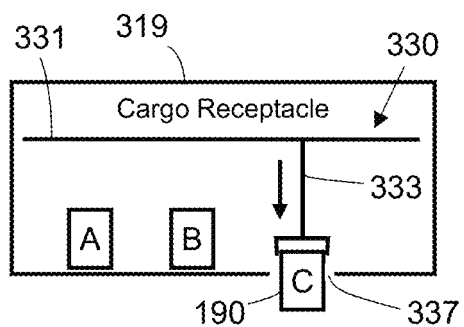
FIG. 6 is the diagram of the cargo receptacle including the package deployment mechanism of FIG. 5, showing product C being ejected from the cargo receptacle.
Figure 7:
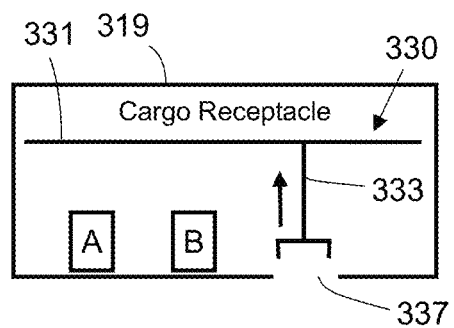
FIG. 7 is the diagram of the cargo receptacle including the package deployment mechanism of FIG. 5, showing an arm of the product deployment mechanism retracting into the cargo receptacle after ejecting product C from the cargo receptacle.

As can be seen in FIG. 3, after picking arm 333 is moved into alignment with package C, the picking arm 233 is lowered in a direction toward package C, as indicated by the arrow in FIG. 6 until the picking arm 333 grasps package C. With package C being grasped by the picking arm 333 as shown in FIG. 6, the picking arm 333 is then moved further downward in the direction indicated by the arrow in FIG. 6, such that the picking arm 333 ejects package C from the cargo receptacle 319 through an opening 337 of the cargo receptacle 319, and either onto a package drop off area at delivery destination C, or into the hands of the customer at the delivery destination C. After package C is ejected, the picking arm 333 is then upwardly in the direction indicated by the arrow in FIG. 7, such that the picking arm 333 retracts back into the cargo receptacle 319 (after which the picking arm 333 can be deployed to move and eject any of packages A and B at delivery destinations A and B).

Figure 8:
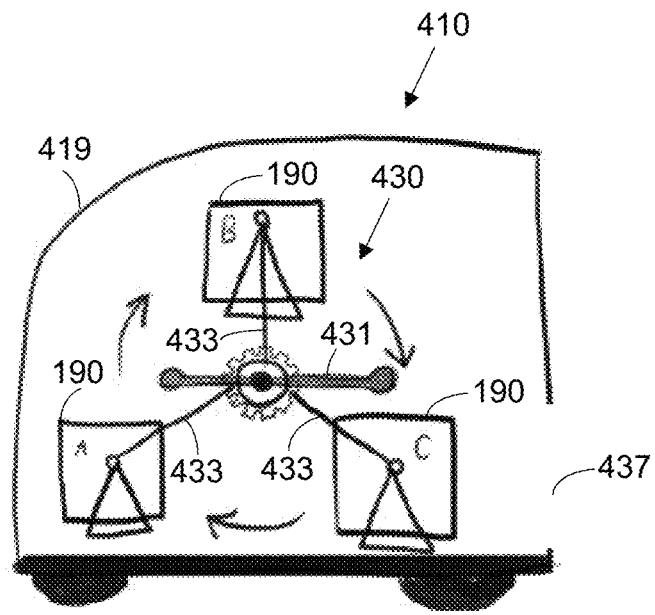
FIG. 8 is a diagram of a cargo receptacle including a package deployment mechanism in accordance with some embodiments showing the products after they are moved from their initial, as loaded positions, to a position where product C is ready to be ejected.
Figure 9:
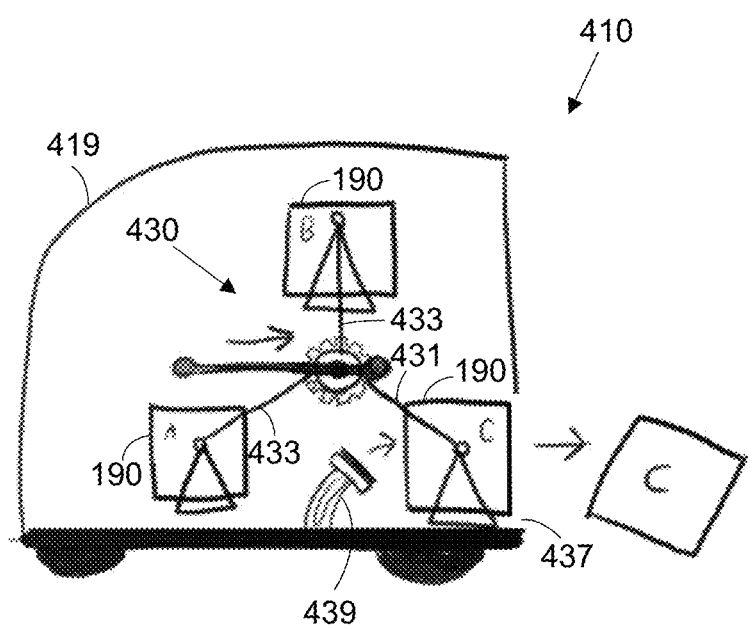
FIG. 9 is the diagram of the cargo receptacle including the package deployment mechanism of FIG. 8, showing product C being ejected from the cargo receptacle.

FIGS. 8 and 9 depict an exemplary ATV 410 (which may be manned or unmanned) configured to deliver packages 190 by moving on the ground along the delivery route 120, which includes a package deployment apparatus 430 according to one embodiment. The package deployment apparatus 430 shown in FIG. 8 includes movable (e.g., pinwheel-based, etc.) support structure 431 configured to support the packages 190 (e.g., A, B, C), and movable arms 433 configured to couple to the packages 190, to move (e.g., rotate) the packages 190 in the direction of the arrows shown in FIG. 8, and to eject one or more of the packages 190 from the cargo receptacle 419 onto a package drop off area at the delivery destination 180 that is next in the drop off sequence. As mentioned above, the package deployment apparatus 430 is activated, in some embodiments, by an activation signal transmitted by the control unit 118 when the ATV 430 is within a predefined threshold distance of the delivery destination 180 (i.e., delivery destination C in this example)).

With reference to FIG. 9, after the package deployment apparatus 430 is deployed, if necessitated by the relative initial as-loaded locations of the products A, B, and C, the movable support structure 431 rotates in the direction indicated by the arrows in FIG. 8, thereby moving the package C into alignment with the opening 437 of the cargo receptacle 419. In the exemplary embodiment depicted in FIG. 9, after package C is moved into alignment with the opening 437 (e.g., door, movable panel, etc.) of the cargo receptacle 419, a package ejector 439 may be activated to move into the direction indicated by the arrow in FIG. 9 in order to eject (i.e., push out) package C from the cargo receptacle 419 through the opening 437 of the cargo receptacle 419, and either onto a package drop off area at delivery destination C, or into the hands of the customer at the delivery destination C. It will be appreciated that the ejector 439 illustrated in FIG. 9 by way of example only, and that package C may be ejected from the cargo receptacle 419 by movement of the support structure 431 and arms 433 alone, by another mechanism, or may not at all be ejected from the cargo receptacle 419, but simply removed by the customer using her or her hands.

Figure 10:
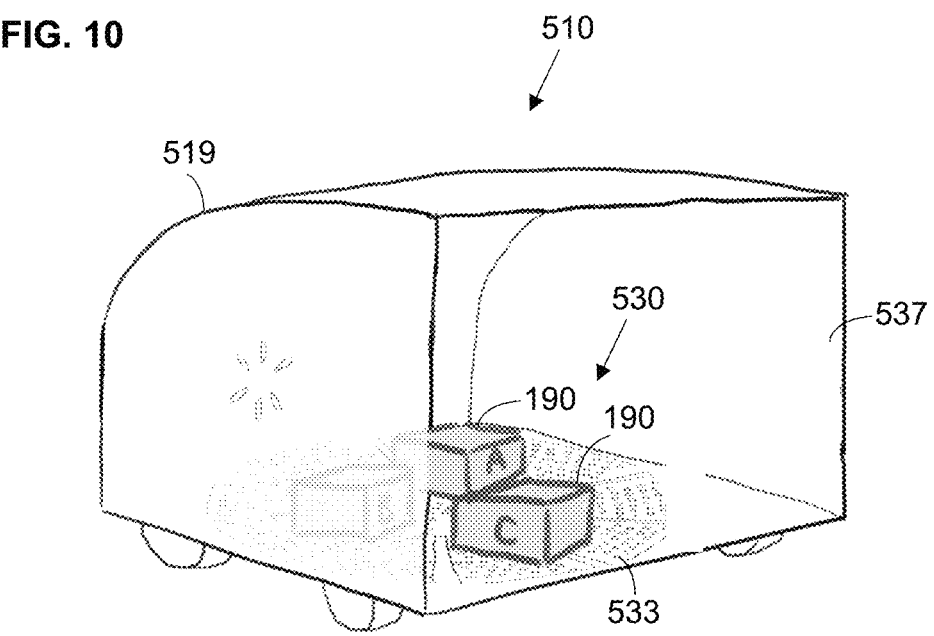
FIG. 10 is a diagram of a cargo receptacle including a package deployment mechanism in accordance with some embodiments showing the products after they are moved from their initial, as loaded positions, to a position where product C is ready to be ejected.
Figure 11:
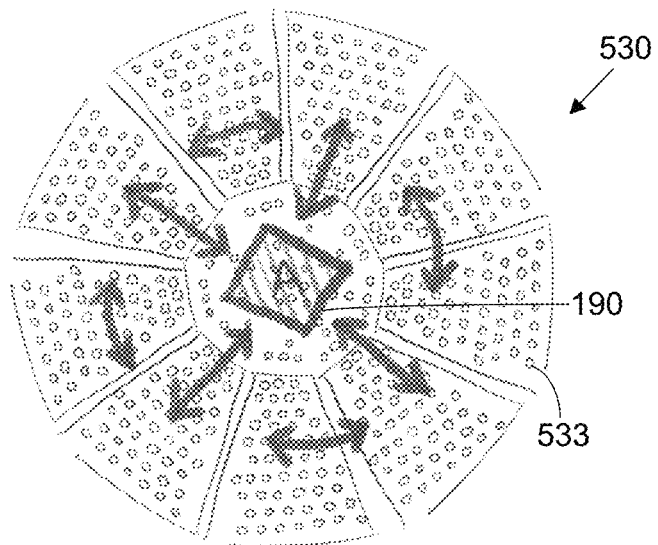
FIG. 11 is a top plan view of a ball-bearing containing support structure of the package deployment mechanism of FIG. 10, showing possible directional movement of one of the products on the support structure.

FIGS. 10 and 11 depict an exemplary ATV 510 (which may be manned or unmanned) configured to deliver packages 190 by moving on the ground along the delivery route 120, which includes a package deployment apparatus 530 according to one embodiment. The package deployment apparatus 530 shown in FIG. 10 includes a support structure 531 configured to support the packages 190 (e.g., A, B, C), and movable (e.g., rotatable) members 533 (ball bearings, etc.) configured to move the packages 190 on the support structure 531 in the directions indicated by the arrows in FIG. 10, and to either eject one or more of the packages 190 from the cargo receptacle 519 through the opening 537 of the cargo receptacle 519, or to position the package 190 (package C in this example) associated with a given (next in drop off sequence) delivery destination 180 by the opening 537 to be removed by the customer and/or operator of the ATV 510. As mentioned above, the package deployment apparatus 530 (and the movement of the movable members 533) is activated, in some embodiments, by an activation signal transmitted by the control unit 118 when the ATV 530 is within a predefined threshold distance of the delivery destination 180 (i.e., delivery destination C in this example)).

In some embodiments, the display 125 of the user interface 121 is configured to display various graphical interface-based menus, options, and/or alerts that may be transmitted to the ATV 110 and displayed on the display 125 in connection with various aspects of the order placed by a customer, including the delivery of the order by the ATV 110 from the ATV deployment location 170 to the delivery destination 180 designated by the customer. In some aspects, the inputs 123 may be configured to permit an operator (e.g., a driver of an ATV deployment vehicle, etc.) to navigate through the on-screen menus of the user interface 121 and make changes and/or updates to the delivery route 120 of the ATV 110 and/or the sequence of delivery destinations 180 in the delivery route 120. It will be appreciated that the display 125 may be configured as both a display and an input (e.g., a touch-screen that permits an operator to press on the display 125 to enter text and/or execute commands.)

The exemplary ATV 110 further includes one or more sensors 114. The sensors 114 can include substantially any relevant device that provides information to the ATV 110 to be used in navigation, customer detection, potential threat detection, distance measurements, environment mapping, location determination, and/or other such sensor information. In some embodiments, the ATV 110 includes sensors 114 including but not limited to one or more sensors to detect an object and/or geographic location that is within one or more predefined threshold distances relative to the ATV 110, capture data within a threshold distance relative to ATV 110, detect movement, measure temperature, capture images and/or video, capture thermographic, infrared, and/or multi spectral images, capture images of entities attempting to tamper with ATV 110, one or more accelerometers, one or more gyroscopes, one or more odometers, one or more location sensors, one or more microphones (e.g., which can be configured to capture audible authentication codes and/or voice prints, threatening language, verbal input from customers, verbal inquiries from customers, etc.), one or more distance measurement sensors (e.g., laser sensors, sonar sensors, sensors that measure distance by emitting and capturing a wireless signal (which can comprise light and/or sound) etc.), 3D scanning sensors, other such sensors, or a combination of two or more of such sensors.

In some aspects, the ATV 110 includes one or more sensors 114 in communication with one or more access panels of ATV 110 and/or positioned adjacent to such access panels to sense when such panels are tampered with. In some aspects, the ATV 110 includes at least one sensor 114 configured to detect at least one obstacle between the ATV 110 and its next delivery destination 180 along the delivery route 120 determined by the control unit 118 of the ATV 110. Based on the detection of one or more obstacles by such a sensor 114, the ATV 110 is configured to avoid the obstacle (s) and/or the control unit 118 of the ATV 110 may be programmed to adjust the delivery route of the ATV 110 to avoid the obstacles(s) and/or to abort the delivery mission of the ATV 110 if the obstacle(s) cannot be avoided.

In some embodiments, the sensors 114 of the ATV 110 are configured to scan identifying indicia located on the product-containing packages 190 being loaded into the ATV 110. The identifying indicia on a package 190 that may be scanned by the sensors 114 may include, but is not limited to: two dimensional barcode, RFID, near field communication (NFC) identifiers, ultra-wideband (UWB) identifiers, Bluetooth identifiers, images, or other such optically readable, radio frequency detectable or other such code, or combination of such codes. In some aspects, as the product-containing packages 190 are being loaded into the cargo receptacle 119 of the ATV 110, the control unit 118 is programmed to obtain the identity of each of the packages 190 and to cause transmission (via the emitter 116), from the ATV 110 to the central electronic database 160, of a signal including an identifying characteristic of the package 190 scanned by the sensor 114.

In some implementations, such a signal by the ATV 110 results in a return signal to be transmitted over the network 115 to the ATV 110 from the central electronic database 160, indicating (e.g., by way of a street address) the delivery destination 180 associated with the identified package 190. In some embodiments, the control unit 118 of the ATV 110 is configured to convert the data indicating the delivery destination 180 associated with the package 190 received from the central electronic database 160 to GPS coordinates. In some aspects, the control unit 118 of the ATV 110 is configured to first obtain GPS coordinates of the ATV deployment location 170 from which the ATV 110 tasked with delivering one or more packages 190 (e.g., A, B, C) to one or more delivery destinations (e.g., A, B, C) will be deployed, then to obtain GPS coordinates of the delivery destination(s) 180 associated with the package(s) 190.

In some embodiments, the control unit 118 is programmed to obtain and/or generate global positioning system (GPS) coordinates of both the ATV deployment location 170 and one or more delivery destinations 180, and to analyze the obtained GPS coordinates to determine a delivery route 120 for the selected ATV 110 from the ATV deployment location 170 to the delivery destinations 180 associated with the packages 190 loaded into the ATV 110. By the same token, in some aspects, the control unit 118 is programmed to analyze such obtained GPS coordinates and/or the determined delivery route 120 in order to determine a drop off sequence in which the packages 190 being delivered by the ATV 110 are to be dropped off by the ATV 110 at their respective delivery destinations, and to guide the ATV 110 toward/away from each delivery destination 180 according to the determined delivery route 120 and drop off sequence.

The sensors 114 of the ATV 110 may include but are not limited to one or more of: a motion-detecting sensor (e.g., to detect a package being loaded into the ATV 110), a photo sensor, a radio frequency identification (RFID) sensor, an optical sensor, a barcode sensor, a digital camera sensor, a size sensor, a volumetric sensor, and a temperature sensor, or the like. In some embodiments, the ATV 110 includes sensors 114 configured to recognize physical characteristic information associated with the packages 190 being loaded into the ATV 110 and/or being picked up by the ATV 110. In some aspects, the sensors 114 can detect actual physical characteristic information of the packages 190 including but not limited to: dimensional characteristics (e.g., size and shape); total weight; total volume, temperature, smell; exterior texture, hazardous material emissions, explosive potential, tamper-evidence status, etc.

After the identified and validated product-containing packages 190 are loaded into the ATV 110, the ATV 110 is configured to deliver such package(s) to one or more delivery destinations 180. As described above, the ATV 110 may be guided from the ATV deployment location 170 to the delivery destination 180 along the predetermined delivery route 120 via the route instructions generated by the control unit 118 of the ATV 110. In some embodiments, the ATV 110 includes one or more sensors 114 (e.g., GPS sensor) configured to detect a location of the ATV 110 relative to the delivery destination 180 along the delivery route 120 where the ATV is to next drop off the package 190 containing the products ordered by the customer associated with that delivery destination 180. Given that the control unit 118 obtains the GPS coordinates of each delivery destination and monitors the GPS coordinates of the ATV 110 during movement of the ATV 110 along the delivery route, the control unit 118 is configured to detect when the ATV 110 is located at a certain predefined threshold distance from the delivery destination 180 that is next in the package drop off sequence.

As discussed above, the ATV 110 includes a variety of sensors 114 that detect status information pertaining to movement of the ATV 110 along its delivery route 120. Since such sensors 114 include a sensor configured for measuring the speed of the ATV 110 and a sensor that relays the GPS coordinates of the ATV 110, and since both the delivery route 120 and the GPS coordinates of the delivery destination 180 that is next in the package drop off sequence are known, in some embodiments, the control unit 118 is configured to calculate the amount of time required that would be required for the ATV 110 to arrive at the delivery destination 180 that is next in the package drop off sequence at any point of the travel of the ATV 110 along the delivery route 120.

Given that the ATV 110 includes sensors 114 that detect each package 190 being loaded into the cargo receptacle 119 of the ATV 110, the total number of packages 190 carried by the ATV 110 at any given time is a known variable for the control unit 118. In addition, in some embodiments, the ATV 110 includes sensors 114 that detect the location of each package 190 (i.e., package A, B, and C) in the cargo receptacle 119. As such, in some aspects, the control unit 118 of the ATV 110 is programmed to calculate the amount of time it would take the package deployment apparatus 130, after being activated by the control unit 118, to move a package 190 (e.g., package C) associated with the delivery destination 180 (e.g., delivery destination C) within the cargo receptacle 119 of the ATV 110 from its storage position shown in FIG. 2 (where the package 190 was initially loaded and is located during transport) to its deployment position shown in FIG. 3 (from which the package 190 can be ejected from the cargo receptacle 119).

As a result, in some embodiments, the control unit 118 is programmed to determine a threshold distance of the ATV 110 from the delivery destination 180 (next in the package drop off sequence), when the package deployment apparatus 130 should be activated in order to move a package 190 (e.g., package C) within the cargo receptacle 119 of the ATV 110 from its storage position of FIG. 2 to its deployed position of FIG. 3 by the time the ATV 110 arrives at the delivery destination 180 that is next in the package drop off sequence. To that end, in some aspects, the control unit 118 is programmed to activate the package deployment apparatus 130 to move, within the cargo receptacle 119, the packages 190 (e.g., package C) associated with the delivery destination 180 (e.g., delivery destination C) that is next in the drop off sequence, based on a determination by the control unit 118 that the ATV 110 is located within a predefined threshold distance from delivery destination C. The activation of the package deployment apparatus 130 and the movement of package C within the cargo receptacle 119 by the package deployment apparatus 130 facilitates the readiness of the ATV 110 to deploy (i.e., drop off, hand-off, etc.) the correct package 190 (i.e., package C) upon arriving at delivery destination C, which advantageously reduces the time spent by the ATV 110 at delivery destination C and improves the overall efficiency of the ATV 110 in completing a given delivery route 120.

In certain implementations, after the control unit 118 determines the threshold distance from each delivery destination 180 along a determined delivery route 120 of the ATV 110 when the package deployment apparatus 130 is to be activated, the control unit 118 transmits the calculated threshold distance to the data store 112 of the ATV 110 for storage and subsequent retrieval. In some embodiments, the control unit 118 is programmed to transmit the calculated threshold distance to the central electronic database 160. In such embodiments, while the ATV 110 is moving along its predefined delivery route 120 toward the delivery destination 180 that is next in the drop off sequence, the control unit 118 is programmed to transmit a signal to the central electronic database 160 in order to identify the delivery destination 180 that is next in the drop off sequence of the ATV 110, and to obtain in response from the central electronic database 160 the predefined threshold distance from the delivery destination 180 that is next in the drop off sequence at which the package deployment apparatus 130 is to be activated by the control unit 118. Storing the predefined threshold distances from each delivery destination 180 of the ATV 110 at which the package deployment apparatus 130 is to be activated on the central electronic database 160 instead of in the data store 112 of the ATV 110 may advantageously reduce the memory requirements of the data store 112 of the ATV 110.

In some embodiments, the ATV 110 includes one or more sensors 114 configured to detect the delivery destination 180 where the package 190 containing the products ordered by customer 105 is to be dropped off and/or retrieved by customer 105. For example, one or more sensors 114 of the ATV 110 may be configured to detect letters (to detect street names) and/or numbers (to detect house numbers on curbs and/or on fences and/or on houses), enabling the control unit 118 of the ATV 110 to authenticate the delivery destination 180 based on the received sensor data. In some embodiments, the sensor 114 is configured to detect the delivery destination 180, for example, via detecting a transmitter (e.g., a beacon) installed at the delivery destination 180 and specific to that delivery destination 180.

In some embodiments, after arriving at the delivery destination 180, the ATV 110 is configured to drop the package 190 containing the products ordered by the customer from the cargo receptacle 119 of the ATV 110 at a product drop off area. Such a product drop off area may be, for example, a drop off pad including one or more sensors configured to permit the ATV 110 to recognize the drop off pad. In one aspect, based on a determination by the control unit 118 that the ATV 110 is at the delivery destination 180 (e.g., delivery destination C) that is next in the drop off sequence, the control unit 118 of the ATV 110 is configured to cause the package deployment apparatus 130 to eject, from the cargo receptacle 119, the package 190 (i.e., package C) that was moved within the cargo receptacle 119 by the package deployment apparatus 130 in response to being activated by the control unit 118 at a predefined threshold distance from that delivery destination 180.

In one aspect, the control unit 118 of the ATV 110 is configured to transmit a control signal to the package deployment apparatus 130 that indicates to the package deployment apparatus which package 190 (e.g., package C) is associated with the delivery destination 180 (e.g., delivery destination C) that is next in the package drop off sequence determined by the control unit 118. As described above with reference to FIGS. 2-11, in response to receipt of such a signal from the control unit 118, the package deployment apparatus 130 is configured to move the package 190 (e.g., package C) associated with the delivery destination 180 (delivery destination C) that is next in the drop off sequence into alignment with the movable picking arm and/or into alignment with an opening of the cargo receptacle such that the package 190 is ready to be mechanically ejected and/or removed by hands from the cargo receptacle 119.

For example, with reference to FIG. 3, after package C, which is located on the movable platform 231 and associated with the delivery destination 180 (delivery destination C) that is next in the drop off sequence, is positioned in alignment with the movable picking arm 233, the control unit 118 of the ATV 110 is configured to transmit a control signal to the package deployment apparatus 230, and this control signal causes the movable picking arm 233 to move towards the movable platform 231, couple to package C, to lift package C off the movable platform 231 while being coupled to by the movable picking arm 233, and after package C is lifted by the movable picking arm 233 off the movable platform 231, to eject (e.g., by continuing to grasp and lower) package C from the cargo receptacle 119 through an opening 237 of the cargo receptacle 119 at the delivery destination 180 that is next in the drop off sequence. In some aspects, instead of ejecting the package 190 from the cargo receptacle 119 while continuing to grasp and lower the product by the movable picking arm 233, the movable picking arm 233 of the movable support 231 is configured to eject the package 190 by releasing the package 190 such that the package 190 simply falls due to gravity through the opening 237 of the cargo receptacle 119.

As discussed above, the ATV 10 includes one or more sensors 114 that are configured to scan identifying indicia on any package 190 stored in the cargo receptacle 119 of the ATV. In one aspect, the control unit 118 is configured to, in response to a scan, by one or more package identity-detecting sensor of the package 190 that has been moved by the activated package deployment apparatus 130 into alignment with the opening 237 of the cargo receptacle 119, to validate that the package 190 that has been moved by the package deployment apparatus 130 into deployment-ready position corresponds to the delivery destination 180 that is next in the drop off sequence. In one approach, such a validation may be performed by way of the ATV 110 transmitting a signal including the identification of the ready-for-deployment package 190 to the central electronic database 160, and obtaining a response from the central electronic database 160 indicating the address of the delivery destination 180 where this package 190 is to be dropped off, which permits the control unit 118 to confirm that the package 190 prepared for deployment by the package deployment apparatus 130 matches the delivery destination 180 where the ATV 110 is arriving next in the predetermined delivery sequence.

In some embodiments, after arriving at the delivery destination 180, the ATV 110 is configured to permit the customer (or a person authorized to accept delivery on behalf of the customer) to retrieve the package 190 containing the products ordered by customer 105 from the cargo receptacle 119 of the ATV 110 at the product drop off area. In certain aspects, the ATV 110 is configured to permit the customer or another person to access the cargo receptacle 119 of the ATV 110 (and to remove the package 190 that was moved in advance into a deployment position by the package deployment apparatus 130) only after authentication of the recipient via one or more of the sensors 114 of the ATV 110.

In some embodiments, the ATV 110 is configured to, in response to either a control signal from the control unit 118, or a verification code entered by a customer (or an authorized person) associated with the delivery destination 180 to accept the delivery, to permit the customer or an authorized person to retrieve the package 190 containing the products ordered by the customer from the cargo receptacle 119 of the ATV 110 at the delivery destination 180. According to some embodiments, the control unit 118 is configured to cause the emitter 116 of the ATV 110 to transmit, via the network 115, a signal to the order processing server 150 and/or central electronic database 160 including an electronic confirmation that the package 190 has been retrieved by the customer or authorized person from the ATV 110 at the delivery destination 180. In some approaches, after causing the transmission of such an electronic confirmation from the ATV 110, the control unit 118 is configured to guide the ATV 110 to the next delivery destination 180 or back to the deployment location 170 along the delivery route 120.

Figure 12:
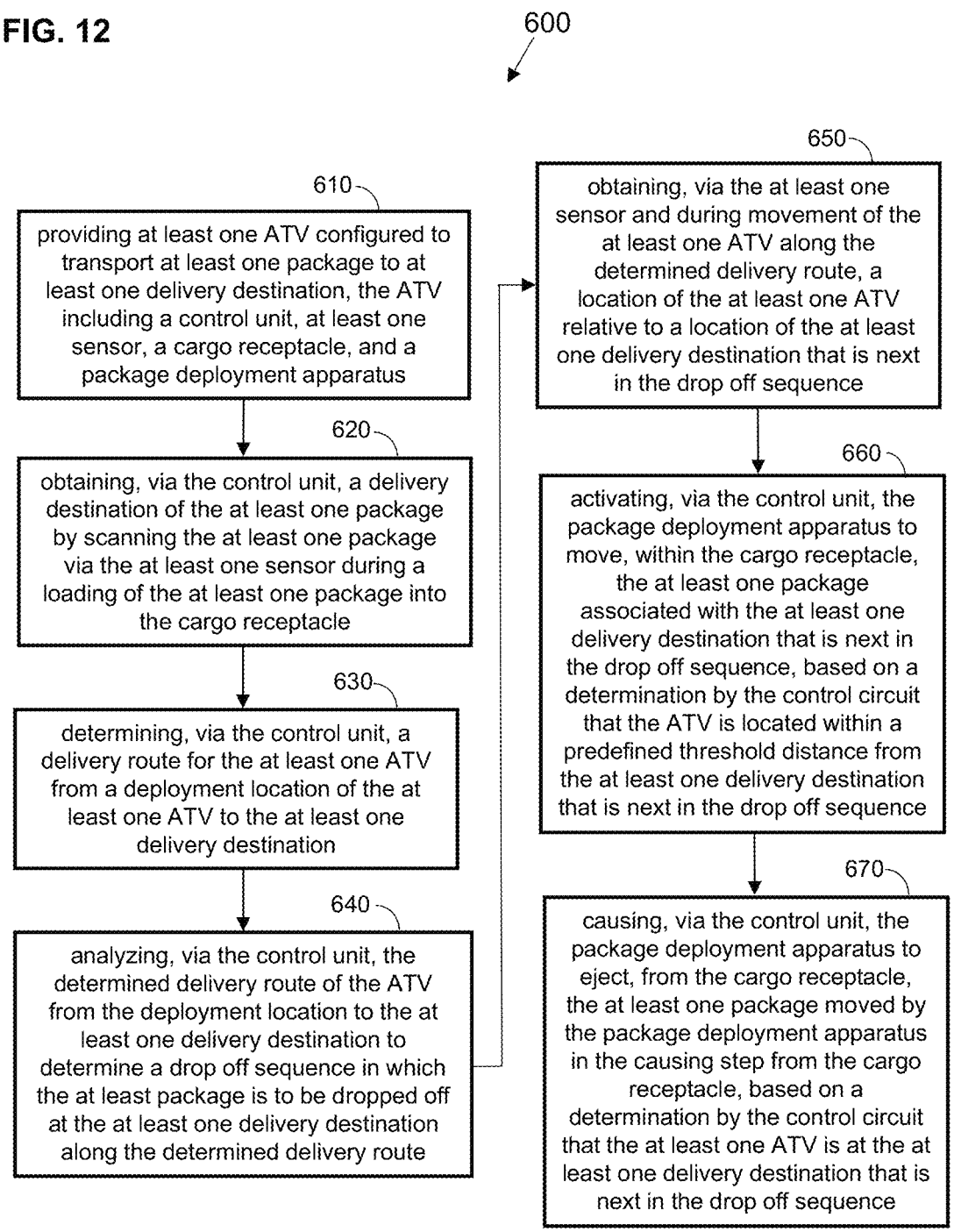
FIG. 12 is a flow chart diagram of a process of facilitating delivery of packages containing products ordered by customers to delivery destinations via unmanned aerial vehicles in accordance with some embodiments.

FIG. 12 depicts an exemplary method 600 of facilitating delivery of packages 190 containing products ordered by customers to delivery destinations 180 via ATVs 110. The method 600 includes providing at least one ATV 110 configured to transport one or more packages 190 to one or more delivery destinations 180, with the ATV 110 including a processor-based control unit 118, at least one sensor 114, a cargo receptacle 119 configured to retain the package(s) 190, and a package deployment apparatus 130 in communication with the control unit 118 and configured to move the package(s) 190 within the cargo receptacle 119 and to eject the package(s) 190 from the cargo receptacle 119 (step 610). As mentioned above, the ATV 110 may be deployed from, for example, an ATV deploying vehicle or a stationary ATV deploying station, at an ATV deployment location 170 to deliver the packages 190 loaded therein to multiple delivery destinations 180 along a delivery route 120 determined by the control unit 118 of the ATV 110. The packages 190 (e.g., A, B, C) to be delivered to various delivery destinations 180 (e.g., A, B, C) may be loaded into the cargo receptacle 119 of the ATV 110 at the ATV deployment location 170, or prior to the loading of the ATV 110 into the ATV-deploying vehicle/launch pad.

The method 600 illustrated in FIG. 12 further includes obtaining, via the control unit 118 of the ATV 110, a delivery destination of one or more packages 190 by scanning the package(s) 190 via one or more sensors 114 of the ATV 110 during the loading of the package(s) 190 into the cargo receptacle 119 (step 620). In other words, in the illustrated embodiment, each package 190 being loaded into the ATV 110 is identified by one or more sensors 114 of the ATV 110. As described above, the control unit 118 of the ATV 110 is programmed to obtain the delivery destination 180 associated with each of the packages 190 that are loaded into the ATV 110. To that end, the method 600 of FIG. 12 includes the step of determining, via the control unit 118, a delivery route 120 for the ATV 110 from an ATV deployment location 170 to one or more delivery destinations 180 (e.g., A, B, and C) where the packages 190 are to be delivered.

As described above, in some implementations, the control unit 118 is configured to determine the delivery route 120 by GPS coordinates of the ATV deployment location 170 and each delivery destination 180 where the ATV 110 is to deliver the packages 190 loaded into the ATV 110, and to analyze the relative GPS coordinates of the ATV deployment location 170 and the delivery destinations 180. In the embodiment illustrated in FIG. 12, the method 600 includes analyzing, via the control unit 118, the determined delivery route 120 of the ATV 110 from the ATV deployment location 170 to the delivery destinations 180 associated with the packages 190 loaded into the ATV 110 to determine a sequence in which the packages 190 are to be dropped off at the delivery destinations 180 along the determined delivery route 120 (step 640).

In some embodiments, after the packages 190 are loaded into the ATV 110 and the ATV 110 is deployed (via air or ground) along its predefined delivery route 120, the location of the ATV 110 is continuously detected by one or more sensors 114 of the ATV 110, and continuously monitored by the control unit 118 of the ATV 110. Notably, the location of each delivery destination 180 was known prior to deployment of the ATV 110, i.e., when the control unit 118 determined the delivery route 120 and the package drop off sequence for the ATV 110. To that end, the exemplary method of FIG. 12 includes obtaining, via one or more sensors of the ATV 110 and during movement of the ATV 110 along the determined delivery route 120, a location of the ATV 110 relative to a location of the delivery destination 180 that is next in the drop off sequence (step 650).

As discussed above, in some embodiments, the control unit 118 is programmed to determine a threshold distance of the ATV 110 from the next delivery destination 180 when the package deployment apparatus 130 should be activated in order to move a package 190 specific to that delivery destination 180 within the cargo receptacle 119 of the ATV 110 from its storage position to its deployed position by the time the ATV 110 arrives at the next delivery destination 180. The activation of the package deployment apparatus 130 and the movement of the package 190 within the cargo receptacle 119 by the package deployment apparatus 130 facilitates the readiness of the ATV 110 to deploy (i.e., drop off, hand-off, etc.) the correct package 190 upon arriving at the delivery destination 180, which advantageously reduces the time spent by the ATV 110 at each delivery destination 180 and improves the overall efficiency of the ATV 110 in completing a given delivery route 120. To that end, the method 600 of FIG. 12 further includes activating, via the control unit 118, the package deployment apparatus 130 to move, within the cargo receptacle 119, the package 190 (e.g., package C) associated with the delivery destination 180 (e.g., delivery destination C) that is next in the drop off sequence (step 660). As can be seen in FIG. 12, the activation step 660 of the exemplary method 300 is based on a determination by the control unit 118 of the ATV 110 that the ATV 110 is located within a predefined threshold distance from the delivery destination 180 that is next in the drop off sequence.

As mentioned above, in some embodiments the ATV 110 includes one or more sensors 114 that detect the location of each of the packages 190 in the cargo receptacle 119 of the ATV 110. As such, the control unit 118 of the ATV 110 is enabled to control the package deployment apparatus 130 of the ATV 110 to precisely detect and move within the cargo receptacle 119 the package 190 (e.g., package A) that is to be deployed at the delivery destination 180 (i.e., delivery destination A) that is next in the determined drop off sequence. As such, when the ATV 110 is located within a predetermined threshold distance of the next delivery destination 180 in the drop off sequence, the activated package deployment apparatus 130 prepares the package 190 (e.g., package C) that is next to be dropped off for deployment by moving the package in the cargo receptacle 119 of the ATV 110 in preparation for deployment and ejection (mechanical or by hand) of the package 190 from the cargo receptacle 119.

When the ATV 110 arrives at the delivery destination 180 that is next in the package drop off sequence, the ATV 110 is ready to drop off the package 190 at the drop off location and/or to permit the customer to retrieve the ready-to-remove package 190 from the cargo receptacle 119 of the ATV 110. As mentioned above, after the ATV 110 arrives to the delivery destination 180 where the product drop off/ retrieval area is located, the ATV 110, which is already programmed with the GPS coordinates of the delivery destination 180, may attempt to verify the identity of the delivery destination 180 by attempting to detect (via the sensor 114) the combination of letters and/or numbers (e.g., house numbers of a curb) that are indicative of a physical address associated with the delivery destination 180 associated with the GPS coordinates.

In one approach, as described above, the address information associated with customer (and the delivery destination 180) is stored in the customer information database 140, and can be obtained for verification purposes by the control unit 118 of the ATV 110, after the ATV 110 transmits sensor data including the combination of letters and numbers detected by the sensor 114 on the street and/or on a curb and/or on a house/building where the delivery is being attempted, which enables the control unit 118 to authenticate the delivery destination 180 based on the address information returned from the customer information database 140. In the illustrated embodiment, after the control unit 118 of the ATV 110 determines that the ATV 110 has arrived at the delivery destination 180 that is next in the package drop off sequence, the method 600 includes causing, via the control unit 118, the package deployment apparatus 130 to eject, from the cargo receptacle 119, the package 190 moved by the package deployment apparatus 130 in the causing step from the cargo receptacle 119 (step 670).

As mentioned above, the ATV 110 may eject the package 190 in a product drop off area at the delivery destination 180 and move on to the delivery destination 180 that is next in the drop off sequence based on the delivery route 120 of the ATV 110. In some implementations, after the ATV 110 delivers the package 190 to its intended delivery destination 180, the control unit 118 of the ATV 110 is programmed to generate and transmit (via emitter 116) an electronic confirmation to the order processing server 150 and/or central electronic database 160 indicating successful delivery of the package 190. In some aspects, after the ATV 110 delivers the package 190 to its intended delivery destination 180, the control unit 118 of the ATV 110 is programmed to generate and transmit (via emitter 116) an electronic notification to a computing device of customer associated with that delivery destination 180 to notify the customer that the package 190 ordered by the customer has been delivered to the customer-designated delivery destination 180.

In some aspects, when the route instructions generated by the control unit 118 of the ATV 110 include an instruction to the ATV 110 to remain at the delivery destination 180 for a predetermined interval of time (e.g., 15 minutes, 30 minutes, 1 hour, or more than 1 hour), the ATV 110 is configured to remain at the delivery destination for the period of time indicated in the route instructions, and the electronic notification transmitted by the ATV 110 to the computing device of the customer includes an indication of the interval of time that the ATV 110 will wait at the product drop off area for the customer to retrieve the package 190 from the cargo receptacle 119 of the ATV 110. In some embodiments, the electronic notification transmitted by the ATV 110 to the computing device of the customer includes a verification code that the customer would be required to provide to the ATV 110 (either via the computing device of the customer or by manually entering via an interface of the ATV 110) in order to gain access to the cargo receptacle 119 of the ATV 110 to retrieve the package 190.

As described above, instead of a verification code that must be entered or otherwise transmitted by the customer, the ATV 110 according to some embodiments is equipped with a sensor 114 configured to detect biometric data associated with the customer, enabling the verification of the customer via the biometric data detected by the sensor 114. As described above, the ATV 110, in response to a verification code or biometric data entered by the customer, permits the customer to retrieve the package 190 containing the products ordered by the customer from the cargo receptacle 119 of the ATV 110. For example, after the customer or a person attempting to retrieve the package 190 from the ATV 110 is authenticated as being authorized, the ATV 110 either opens the cargo receptacle 119 to permit the customer to remove the package 190 from the cargo receptacle 119, or ejects the package 190 from the cargo receptacle 119 without opening the cargo receptacle 119 to access by the customer.

In some aspects, the package 190 is ejected from the ATV 110 by the package deployment apparatus 130 from the ready-to-deploy position (e.g., FIG. 3) in the cargo receptacle 119 to which the package deployment apparatus 130 moved the package 190 from its initial position shown in FIG. 2, based on instructions received from the control unit 118, when the ATV 110 crossed a predefined threshold distance from the delivery destination 180 designated by the customer. In other words, the package 190 (e.g., package C) was moved within the cargo receptacle 119 of the ATV 110 while the ATV 110 was still en-route to the delivery destination 180, and was positioned by the package deployment apparatus 130 into the ready-to-deploy position of FIG. 3, from which the package 190 is either readily ejected by the package deployment apparatus 130 from the cargo receptacle 119 of the ATV 110, or from which the customer can readily remove by hand the package 190 from the cargo receptacle 119 of the ATV 110.

In some configurations, the control unit 118 of the ATV 110 is programmed to generate and transmit (e.g., via the emitter 116 and to the order processing server and/or central electronic database 160) a signal including an electronic confirmation that the package 190 ordered by a customer associated with a given delivery destination 180 has been successfully dropped off or retrieved by the customer by/from the ATV 110 at the delivery destination 180 designated by the customer. In one approach, after transmission of this electronic delivery confirmation, the control unit 118 is programmed to guide the ATV 110 back to the ATV deployment location 170 or to another delivery destination 180, depending on location of the ATV 110 relative to the predefined delivery route 120.

The systems and methods described herein advantageously allow customers to purchase products from a retailer and have the products conveniently delivered to their designated delivery destinations by autonomous transport vehicles, which are configured to rearrange the packages that they transport while they are en-route to their delivery destinations. As a result, when the autonomous transport vehicles arrive to their intended delivery destinations, they are ready to deploy the packages therefrom right away, and do not require any additional package rearrangement steps when the ATVs are at their delivery destinations. As such, the systems and methods described herein provide a significant convenience for the customer of the retailer who is able to retrieve his/her package without a delay when an ATV arrives to his/her designated delivery destination, which is likely to increase customer satisfaction with the delivery service. In addition, such systems and methods provide retailers with significant operation cost savings, since the ATVs spend less time at each delivery destination and complete their assigned delivery routes faster.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system of facilitating delivery of packages containing products ordered by customers to delivery destinations via autonomous transport vehicles, the system comprising:
   at least one autonomous transport vehicle configured to transport at least one package to at least one delivery destination, the autonomous transport vehicle including:
      a processor-based control unit;
      at least one sensor;
      a cargo receptacle configured to retain the at least one package; and
      a package deployment apparatus in communication with the control unit and configured to move the at least one package within the cargo receptacle and to eject the at least one package from the cargo receptacle;
   a central electronic database configured to store one or more predefined threshold distances from the at least one delivery destination;
   wherein the control unit is configured to:
      obtain a delivery destination of the at least one package in response to a scan of the at least one package via the at least one sensor during a loading of the at least one package into the cargo receptacle;
      determine a delivery route for the at least one autonomous transport vehicle from a deployment location of the at least one autonomous transport vehicle to the at least one delivery destination;
      analyze the determined delivery route of the autonomous transport vehicle from the deployment location to the at least one delivery destination to determine a drop off sequence in which the at least package is to be dropped off at the at least one delivery destination along the determined delivery route;
      cause transmission from the at least one autonomous transport vehicle and to the central electronic database, a signal including an identification of a delivery destination that is next in the drop off sequence of the at least one autonomous transport vehicle;
      receive, from the central electronic database, a predefined threshold distance from the delivery destination that is next in the drop off sequence;
      obtain, via the at least one sensor and during movement by the at least one autonomous transport vehicle along the determined delivery route, a location of the at least one autonomous transport vehicle relative to a location of the delivery destination that is next in the drop off sequence;
      activate the package deployment apparatus to move, within the cargo receptacle, the at least one package associated with the delivery destination that is next in the drop off sequence, based on a determination by the control circuit that the autonomous transport vehicle is located within the predefined threshold distance from the delivery destination that is next in the drop off sequence; and
      cause the package deployment apparatus to eject, from the cargo receptacle, the at least one package moved within the cargo receptacle by the package deployment apparatus from the cargo receptacle, based on a determination by the control circuit that the at least one autonomous transport vehicle is at the delivery destination that is next in the drop off sequence.

2. The system of claim 1, wherein the at least one sensor is one or more sensors each selected from a group consisting of: an altimeter, a velocimeter, a gyroscope, an accelerometer, a magnetometer, a thermometer, a battery life sensor, a radar, a lidar, a global positioning system (GPS) sensor, a laser range finder, a sonar, a motion-detecting sensor, an object proximity sensor, a radio frequency identification (RFID) sensor, an optical sensor, a barcode sensor, a photo sensor, and a digital camera sensor.

3. The system of claim 1, further comprising a central electronic database configured to store information indicating the at least one delivery destination associated with the at least one package, and wherein the control unit is further configured to:
   cause transmission from the at least one autonomous transport vehicle and to the central electronic database, a signal including an identifying characteristic of the at least one package scanned by the at least one sensor;
   receive, from the central electronic database, the information indicating the at least one delivery destination associated with the at least one package; and
   convert the received information indicating the at least one delivery destination.

4. The system of claim 1, wherein the control unit is further configured to:
   obtain global positioning system (GPS) coordinates of the deployment location of the at least one autonomous transport vehicle tasked with delivering the at least one package to the at least one delivery destination;
   obtain global positioning system (GPS) coordinates of the at least one delivery destination associated with the at least one package; and
   generate the delivery route based on an analysis, by the control circuit, of the obtained GPS coordinates of the deployment location and the obtained GPS coordinates of the at least one delivery destination.

5. The system of claim 1,
   wherein the package deployment apparatus comprises a movable platform configured to support the at least one package thereon and a movable picking arm configured to couple to the at least one package located on the movable platform and to lift the at least one package from the movable platform;
   wherein the control unit is configured to transmit a control signal to the package deployment apparatus, the control signal indicating the at least one package located on the movable platform that is associated with the at least one delivery destination that is next in the drop off sequence; and
   wherein, in response to the control signal, the movable platform is configured to move such that the at least one package located on the movable platform and associated with the at least one delivery destination that is next in the drop off sequence is positioned in alignment with the movable picking arm.

6. The system of claim 5, wherein the control unit is configured to transmit a control signal to the package deployment apparatus, the control signal configured to cause the movable picking arm to:
   move towards the platform;
   couple to the at least one package that is positioned in alignment with the movable picking arm during the moving step;

lift the at least one package coupled to by the movable picking arm off the movable platform; and eject the at least one package lifted by the movable picking arm off the movable platform from the cargo receptacle through an opening of the cargo receptacle onto a package drop off area at the at least one delivery destination that is next in the drop off sequence.

7. The system of claim 1, wherein the package deployment apparatus comprises a movable support structure including at least one arm configured to couple to and retain the at least one package;

wherein the control circuit is configured to transmit a control signal to the package deployment apparatus, the control signal indicating the at least one package being retained by the at least one arm of the movable support structure that is associated with the at least one delivery destination that is next in the drop off sequence; and wherein, in response to the control signal, the movable support structure is configured to move such that the at least one package being retained by the at least one arm of the movable support structure that is associated with the at least one delivery destination that is next in the drop off sequence is positioned in alignment with an opening of the cargo receptacle.

8. The system of claim 7, wherein the control unit is configured to transmit a control signal to the package deployment apparatus, the control signal causing the arm of the movable support structure to one of:

eject the at least one package being retained by the at least one arm of the movable support structure from the cargo receptacle by uncoupling the at least one arm from the at least one package such that the at least one package falls through the opening of the cargo receptacle and onto a package drop off area at the at least one delivery destination that is next in the drop off sequence; and eject the at least one package being retained by the at least one arm of the movable support structure from the cargo receptacle by lowering the at least one package, while being coupled to by the at least one arm, through the opening of the cargo receptacle and onto a package drop off area at the at least one delivery destination that is next in the drop off sequence.

9. The system of claim 1, wherein the control unit is configured to, in response to a scan, by the at least one sensor, of the at least one package associated with the at least one delivery destination that is next in the drop off sequence and which has been moved by the activated package deployment apparatus, to validate that the at least one package that has been moved by the package deployment apparatus corresponds to the at least one delivery destination that is next in the drop off sequence.

10. A method of facilitating delivery of packages containing products ordered by customers to delivery destinations via autonomous transport vehicles, the method comprising:

providing at least one autonomous transport vehicle configured to transport at least one package to at least one delivery destination, the autonomous transport vehicle including:
  a processor-based control unit;
  at least one sensor;
  a cargo receptacle configured to retain the at least one package; and
  a package deployment apparatus in communication with the control unit and configured to move the at least one package within the cargo receptacle and to eject the at least one package from the cargo receptacle;

providing a central electronic database configured to store one or more predefined threshold distances from the at least one delivery destination;

obtaining, via the control unit, a delivery destination of the at least one package by scanning the at least one package via the at least one sensor during a loading of the at least one package into the cargo receptacle;

determining, via the control unit, a delivery route for the at least one autonomous transport vehicle from a deployment location of the at least one autonomous transport vehicle to the at least one delivery destination;

analyzing, via the control unit, the determined delivery route of the autonomous transport vehicle from the deployment location to the at least one delivery destination to determine a drop off sequence in which the at least package is to be dropped off at the at least one delivery destination along the determined delivery route;

transmitting, from the at least one autonomous transport vehicle and to the central electronic database, a signal including an identification of a delivery destination that is next in the drop off sequence of the at least one autonomous transport vehicle;

receiving, at the at least one autonomous transport vehicle and from the central electronic database, the predefined threshold distance from the delivery destination that is next in the drop off sequence;

obtaining, via the at least one sensor and during movement of the at least one autonomous transport vehicle along the determined delivery route, a location of the at least one autonomous transport vehicle relative to a location of the delivery destination that is next in the drop off sequence;

activating, via the control unit, the package deployment apparatus to move, within the cargo receptacle, the at least one package associated with the delivery destination that is next in the drop off sequence, based on a determination by the control circuit that the autonomous transport vehicle is located within the predefined threshold distance from the delivery destination that is next in the drop off sequence; and causing, via the control unit, the package deployment apparatus to eject, from the cargo receptacle, the at least one package moved by the package deployment apparatus in the activating step from the cargo receptacle, based on a determination by the control circuit that the at least one autonomous transport vehicle is at the delivery destination that is next in the drop off sequence.

11. The method of claim 10, wherein the at least one sensor is one or more sensors each selected from a group consisting of: an altimeter, a velocimeter, a gyroscope, an accelerometer, a magnetometer, a thermometer, a battery life sensor, a radar, a lidar, a global positioning system (GPS) sensor, a laser range finder, a sonar, a motion-detecting sensor, an object proximity sensor, a radio frequency identification (RFID) sensor, an optical sensor, a barcode sensor, a photo sensor, and a digital camera sensor.

12. The method of claim 10, further comprising providing a central electronic database configured to store information indicating the at least one delivery destination associated with the at least one package, and wherein the obtaining step further comprises:

transmitting, from the at least one autonomous transport vehicle and to the central electronic database, a signal including an identifying characteristic of the at least one package scanned by the at least one sensor;

receiving, at the at least one autonomous transport vehicle and from the central electronic database, the information indicating the at least one delivery destination associated with the at least one package; and converting, via the control unit, the received information indicating the at least one delivery destination associated with the at least one package to global positioning system (GPS) coordinates.

13. The method of claim 10, wherein the determining step further comprises:

obtaining global positioning system (GPS) coordinates of the deployment location of the at least one autonomous transport vehicle tasked with delivering the at least one package to the at least one delivery destination;

obtaining global positioning system (GPS) coordinates of the at least one delivery destination associated with the at least one package; and generating the delivery route based on an analysis, by the control circuit, of the obtained GPS coordinates of the deployment location and the obtained GPS coordinates of the at least one delivery destination.

14. The method of claim 10 wherein the package deployment apparatus comprises a movable platform configured to support the at least one package thereon and a movable picking arm configured to couple to the at least one package located on the movable platform and to lift the at least one package from the movable platform, and wherein the activating step further comprises:

transmitting, via the control unit, a control signal to the package deployment apparatus, the control signal indicating the at least one package located on the movable platform that is associated with the at least one delivery destination that is next in the drop off sequence; and moving, in response to the control signal, the movable platform such that the at least one package located on the movable platform and associated with the at least one delivery destination that is next in the drop off sequence is positioned in alignment with the movable picking arm.

15. The method of claim 14, wherein the causing step further comprises:

transmitting, via the control unit, a control signal to the package deployment apparatus, the control signal causing the movable picking arm to:

move towards the platform;

couple to the at least one package that is positioned in alignment with the movable picking arm during the moving step;

lift the at least one package coupled to by the movable picking arm off the movable platform; and eject the at least one package lifted by the movable picking arm off the movable platform from the cargo receptacle through an opening of the cargo receptacle onto a package drop off area at the at least one delivery destination that is next in the drop off sequence.

16. The method of claim 10, wherein the package deployment apparatus comprises a movable support structure including at least one arm configured to couple to and retain the at least one package, and wherein the activating step further comprises:

transmitting, via the control unit, a control signal to the package deployment apparatus, the control signal indicating the at least one package being retained by the at least one arm of the movable support structure that is associated with the at least one delivery destination that is next in the drop off sequence; and moving, in response to the control signal, the movable support structure such that the at least one package being retained by the at least one arm of the movable support structure that is associated with the at least one delivery destination that is next in the drop off sequence is positioned in alignment with an opening of the cargo receptacle.

17. The method of claim 16, wherein the causing step further comprises:

transmitting, via the control unit, a control signal to the package deployment apparatus, the control signal causing the arm of the movable support structure to one of:

eject the at least one package being retained by the at least one arm of the movable support structure from the cargo receptacle by uncoupling the at least one arm from the at least one package such that the at least one package falls through the opening of the cargo receptacle and onto a package drop off area at the at least one delivery destination that is next in the drop off sequence; and eject the at least one package being retained by the at least one arm of the movable support structure from the cargo receptacle by lowering the at least one package, while being coupled to by the at least one arm, through the opening of the cargo receptacle and onto a package drop off area at the at least one delivery destination that is next in the drop off sequence.

18. The method of claim 10, wherein the activating step further comprises scanning the at least one package associated with the at least one delivery destination that is next in the drop off sequence and which has been moved by the activated package deployment apparatus, in order to validate that the at least one package that has been moved by the package deployment apparatus corresponds to the at least one delivery destination that is next in the drop off sequence.

* * * * *